United States Patent [19]

Liu

[11] Patent Number: 6,005,694
[45] Date of Patent: *Dec. 21, 1999

[54] METHOD AND SYSTEM FOR DETECTING OPTICAL FAULTS WITHIN THE OPTICAL DOMAIN OF A FIBER COMMUNICATION NETWORK

[75] Inventor: Shoa-Kai Liu, Richardson, Tex.

[73] Assignee: MCI WorldCom, Inc., Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 08/580,391

[22] Filed: Dec. 28, 1995

[51] Int. Cl.[6] ........................... H04B 10/08
[52] U.S. Cl. .................... 359/110; 359/117
[58] Field of Search .................. 359/110, 117, 359/118, 125; 370/223, 227, 228, 243, 247, 248

[56] References Cited

U.S. PATENT DOCUMENTS

| | | | |
|---|---|---|---|
| 4,451,916 | 5/1984 | Casper et al. | 370/16 |
| 4,527,270 | 7/1985 | Sweeton | 371/11 |
| 4,542,502 | 9/1985 | Levinson et al. | 370/88 |
| 4,560,246 | 12/1985 | Cotter . | |
| 4,561,119 | 12/1985 | Epworth . | |
| 4,596,982 | 6/1986 | Bahr et al. | 340/825.05 |
| 4,704,714 | 11/1987 | Tomizawa et al. | 370/15 |
| 4,745,597 | 5/1988 | Morgan et al. | 370/87 |
| 4,763,315 | 8/1988 | Nakayashiki et al. | 370/16 |
| 4,768,190 | 8/1988 | Giancarlo | 370/86 |
| 4,797,589 | 1/1989 | Collins | 370/63 |
| 4,821,255 | 4/1989 | Kobrinski . | |
| 4,831,662 | 5/1989 | Kuhn | 455/608 |
| 4,845,736 | 7/1989 | Posner et al. | 379/27 |
| 4,866,699 | 9/1989 | Brackett et al. . | |
| 4,887,256 | 12/1989 | Nakayashiki et al. | 370/16 |

(List continued on next page.)

FOREIGN PATENT DOCUMENTS

| | | |
|---|---|---|
| 0 507 379 | 10/1992 | European Pat. Off. . |
| 2 233 851 | 1/1991 | United Kingdom . |

OTHER PUBLICATIONS

Rabou et al., "Optical Fiber Two–Way FM Video Signal Transmission for Video Conferencing Application," *IEEE Transactions on Consumer Electronics*, vol. 40, No. 3, Aug. 1994, pp. 492–496.

Patent Abstracts of Japan, vol. 095, No. 001, Feb. 28, 1995, JP 06 291739 A, Oct. 18, 1994.

(List continued on next page.)

*Primary Examiner*—Rafael Bacares

[57] ABSTRACT

A method and system for detecting optical signal degradation or loss within the optical domain of a fiber network. Optical cross-connect switches (OCCS) are provided at network nodes. Optical data traffic is conducted between nodes via a fiber link. The fiber link extends between respective ports of the optical cross-connect switches at each network node. Dedicated signals for detecting faults are introduced and removed within the optical domain of the fiber communication network. In one embodiment, transmitter/receiver units are coupled directly to the fiber link for broadcasting optical signals for fault detection. In another embodiment, transmitter/receiver units are coupled to the fiber link through one or more dedicated ports within optical cross-connect switches (OCCS) at network nodes. Optical signals for fault detection are then broadcast or switched through working and/or spare fibers. Distinctive optical fault detection signals are used when the signals are broadcast or switched over working fibers. Optical signal impairment or loss for a particular link or span is detected simply and quickly in the network optical domain. Rapid, accurate optical fault capability can be added to communication networks without requiring changes to existing light terminal elements and processing circuitry in the electrical domain.

25 Claims, 5 Drawing Sheets

U.S. PATENT DOCUMENTS

| | | |
|---|---|---|
| 4,956,835 | 9/1990 | Grover . |
| 4,964,095 | 10/1990 | Tyrrell et al. ............................. 370/55 |
| 5,058,105 | 10/1991 | Mansour et al. .......................... 370/16 |
| 5,069,521 | 12/1991 | Hardwick ................................. 385/24 |
| 5,081,452 | 1/1992 | Cozic ....................................... 370/16 |
| 5,091,902 | 2/1992 | Chopping et al. ..................... 370/16.1 |
| 5,166,821 | 11/1992 | Huber . |
| 5,179,548 | 1/1993 | Sandesara ............................. 370/16.1 |
| 5,182,744 | 1/1993 | Askew et al. ............................. 370/15 |
| 5,200,964 | 4/1993 | Huber . |
| 5,218,465 | 6/1993 | Lebby et al. ............................ 359/110 |
| 5,271,075 | 12/1993 | Gfeller et al. ............................ 385/20 |
| 5,299,293 | 3/1994 | Metdagh et al. ........................ 359/110 |
| 5,327,427 | 7/1994 | Sandesara ............................... 359/124 |
| 5,329,392 | 7/1994 | Cohen ..................................... 359/124 |
| 5,329,396 | 7/1994 | Fishman et al. . |
| 5,329,520 | 7/1994 | Richardson .............................. 370/16 |
| 5,333,130 | 7/1994 | Weissmann et al. ..................... 370/16 |
| 5,341,364 | 8/1994 | Marra et al. ............................ 370/16.1 |
| 5,343,464 | 8/1994 | Iino et al. ................................. 370/16 |
| 5,359,450 | 10/1994 | Ramachandran et al. . |
| 5,365,510 | 11/1994 | Nicholson et al. ....................... 370/16 |
| 5,373,383 | 12/1994 | LaGasse . |
| 5,373,385 | 12/1994 | Darcie et al. . |
| 5,383,046 | 1/1995 | Tomofuji et al. ....................... 359/179 |
| 5,396,357 | 3/1995 | Goossen et al. ........................ 359/119 |
| 5,420,868 | 5/1995 | Chraplyvy et al. . |
| 5,434,691 | 7/1995 | Yamane .................................. 359/117 |
| 5,440,418 | 8/1995 | Ishimura et al. ........................ 359/110 |
| 5,442,472 | 8/1995 | Skrobko ................................. 359/110 |
| 5,442,623 | 8/1995 | Wu ........................................ 370/16.1 |
| 5,457,555 | 10/1995 | Moriyama .............................. 359/110 |
| 5,457,556 | 10/1995 | Shiragaki ................................. 359/17 |
| 5,459,715 | 10/1995 | Furuta et al. ............................. 370/16 |
| 5,479,608 | 12/1995 | Richardson ........................ 395/182.02 |
| 5,495,471 | 2/1996 | Chow et al. .............................. 370/16 |
| 5,500,756 | 3/1996 | Tsushima et al. ....................... 359/177 |
| 5,517,489 | 5/1996 | Ogura ..................................... 370/16.1 |
| 5,602,828 | 2/1997 | Engdahl et al. ......................... 370/228 |
| 5,625,478 | 4/1997 | Doerr et al. ............................. 359/125 |
| 5,647,035 | 7/1997 | Cadeddu et al. .......................... 385/24 |
| 5,675,428 | 10/1997 | Henmi ..................................... 359/161 |
| 5,680,235 | 10/1997 | Johansson .............................. 359/110 |

OTHER PUBLICATIONS

Chao et al., "FASTAR—A Robust System for Fast DS3 Restoration," *Globecom '91*, 991, p. 396–1400.

Hadjifotiou et al., "Supervisory Options for Fibre Optical Amplifier Systems," *Fourth I.E.E. Conference on Telecommunication*, Conference Publication No. 371, Apr. 18, 1993, pp. 53–56.

Matsuoka et al., "Supervisory Signal Transmission Methods for Optical Amplifier Repeater Systems," *IEEE*, 1990, pp. 1846–1850.

Murakami et al., "A Remote Supervisory System Based on Subcarrier Overmodulation for Submarine Optical Amplifier Systems," *IEEE: Journal of Lightwave Technology*, vol. 14, No. 5, May, 1996, pp. 671–677.

Park, E. et al., "Simultaneous All–Optical Packet–Header Replacement and Wavelength Shifting for Dynamically–Reconfigurable WDM Network," *IEEE Photonics Technology Letters*, vol. 7, No. 7, Jul., 1995, pp. 810–812.

Riaziat, M. L. et al., "Optical Wavelength Shifting by Traveling–Wave Electrooptic Modulation," *IEEE Photonics Technology Letters*, vol. 5, No. 9, Sep. 1993, pp. 1002–1005.

Yamabayashi et al., "Supervisory Signal Transmission by Modulating the mB1C Code Complementary Bit," *IEEE: Journal of Hightwave Technology*, vol. 9, No. 3, Mar., 1991, pp. 381–385.

Zhou, J. et al., "Four–Wave Mixing Wavelength Coversion Efficiency in Semiconductor Traveling–Wave Amplifiers Measured to 65 nm of Wavelength Shift," *IEEE Photonics Technology Letters*, vol. 6, No. 8, Aug., 1994, pp. 984–987.

Bhagavathk, Vijay K., "Reliability Evaluation and Protection Schemes for Dense WDM Network Architectures," 92CH3132 I.E.E.E., pp. 0174–0178 (1992).

Brackett, C., "Dense Wavelength Division Multiplexing Networks: Principles & Applications," I.E.E.E. Journal on Selected Areas in Communications, vol.8, No. 6, pp. 948–664 (Aug. 1990).

DeMeis, R., "Select the Right Test Equipment for Your Fiber Optic Needs," Laser Focus World, pp. 161–173 (Oct. 1995).

Green, P., Fiber Optic Networks, Prentice Hall, pp. 7–10 (1993).

Grover, Wayne Ph.D., "Distributed Restoration of the Transport Network," Network Management into the 21st Century, Chapter 11, IEEE Press, p. 337.

Hecht, Jeff., "Push is on for Multiwavelength Optical Networks," Laser Focus World, pp. 59–61 (Oct. 1995).

Minoli, D., "Telecommunications Technology Handbook," Artech House: Norwood, MA, chptrs. 3 and 7 (1995).

Spirit, D.M. et al., eds. High Capacity Optical Transmission Explained, John Wiley & Sons, West Sussex, England, chptrs. 1, 6 and 7 (1995).

Waynant et al., "Optical Integrated Circuits," Electro–Optics Handbook, (McGraw–Hill, Inc., USA), chpt. 26, pp. 26.1–26.39 (1994).

Wu, T., "Emerging Technologies for Fiber Network Survivability," IEEE Communications Magazine, pp. 58–74, (Feb. 1995).

Wu, T. et al., "Strategies and Technologies for Planning a Cost–Effective Survivable Fiber Network Architecture Using Optical Switches," CH2655–9 IEEE pp. 749–755, (1989).

METHOD AND SYSTEM FOR DETECTING OPTICAL FAULTS WITHIN THE OPTICAL DOMAIN OF A FIBER COMMUNICATION NETWORK

BACKGROUND OF THE INVENTION

1. Field of the Invention

The present invention relates generally to fiber optic telecommunication. More particularly, the present invention pertains to a system and method for simple, rapid detection of an optical fault within the optical domain in a communication network.

2. Related Art

A communication network serves to transport information among a number of locations. The information to be transported is often presented to the network in the form of time-domain electrical signals representing a combination of telephony, video, or computer data in a variety of formats. A typical communication network has many physical sites called nodes interconnected by information conduits called links. Each link carries data from one node to another node. Each node can contain equipment for combining, separating, transforming, conditioning, and routing data.

Optical fibers are increasingly relied upon for carrying vital communications traffic. Fiber trunks extend between nodes (i.e. cities) forming networks extending across states, nations, and continents. Fiber cables whether laid out above ground, underground, or underwater are subject to damage. For example, lightning, backhoes, fires, train derailment, trawler nets, and shark attacks have been reported to have severed or impaired optical fiber connectivity. See, Grover, Wayne PhD., "Distributed Restoration of the Transport Network," *Network Management into the 21st Century*, Chapter 11, IEEE Press, (1991), p 337.

Fiber optic cables carry far greater amounts of digital data than conventional electrical cables. A single fiber operating at approximately 10 Gb/s and packeting data according to a standard SONET OC-192 protocol, carries data equivalent to over 128,000 voice calls. Moreover, dozens of fibers may be included in a single cable. The impact of a cable cut, or even a single optical fiber failure, can be widespread. Sudden link failure due to a fiber failure, cable cut, nodal failure, or any other system error can cause a significant loss in revenue for a network owner or network subscriber.

Sophisticated consumers no longer tolerate disruptions of service. Prompt detection of optical signal impairment or loss is therefore essential to effective network management. Conventional restoration systems detect loss of fiber connectivity in the electrical domain. For example, the absence of a traffic signal at a light terminal element (LTE) receiver is detected. Detecting signal loss at the LTE can take two or more seconds—too slow for modern industry demands.

All-optical networks often include endpoint nodes optically interconnected through paths which include intermediate optical switching nodes. Each path can include multiple intermediate nodes coupled to one another through multiple spans or links. Detecting signal loss at an LTE located at an endpoint node, however, only provides a fault indication for the entire path between endpoint nodes. The specific intermediate span or link which is the source of the fault indication cannot be distinguished.

Moreover, implementing additional detection circuitry in the electrical domain can be costly. At a practical level, some existing LTE circuits cannot be easily accessed or re-configured to accommodate fiber fault detection processing.

What is needed is a simple, fast method and system for detecting optical faults in the optical domain of a fiber optic network.

SUMMARY OF THE INVENTION

The present invention provides a method and system for detecting optical signal degradation or loss within the optical domain of a fiber network. Dedicated optical signals for detecting fiber faults are introduced and removed within the optical domain of the fiber network. Such fiber faults can include fiber failure, cable cut, nodal failure or any other system error.

In one embodiment, transmitter/receiver units are coupled directly to the fiber link for broadcasting optical signals for fault detection over working and/or spare fibers. In another embodiment, transmitter/receiver units are coupled to the fiber link through one or more dedicated ports within optical cross-connect switches (OCCS) at network nodes. In each embodiment, optical signals for fault detection can be broadcast or switched through working and/or spare fibers.

According to another aspect of the present invention, distinctive optical fault detection signals are used when the signals are broadcast or switched over working fibers. For example, a dedicated wavelength can be added to distinguish optical fault detection signals from normal data traffic across the fiber network.

Thus, in the present invention, optical signal impairment or loss is detected simply and quickly in the network optical domain. Fault indications for a specific span along an optical path between endpoint nodes are provided. Rapid, accurate optical fault capability can be added to communication networks without requiring changes to existing light terminal elements and processing circuitry in the electrical domain.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art make and use the invention.

In the drawings

Figure 1:
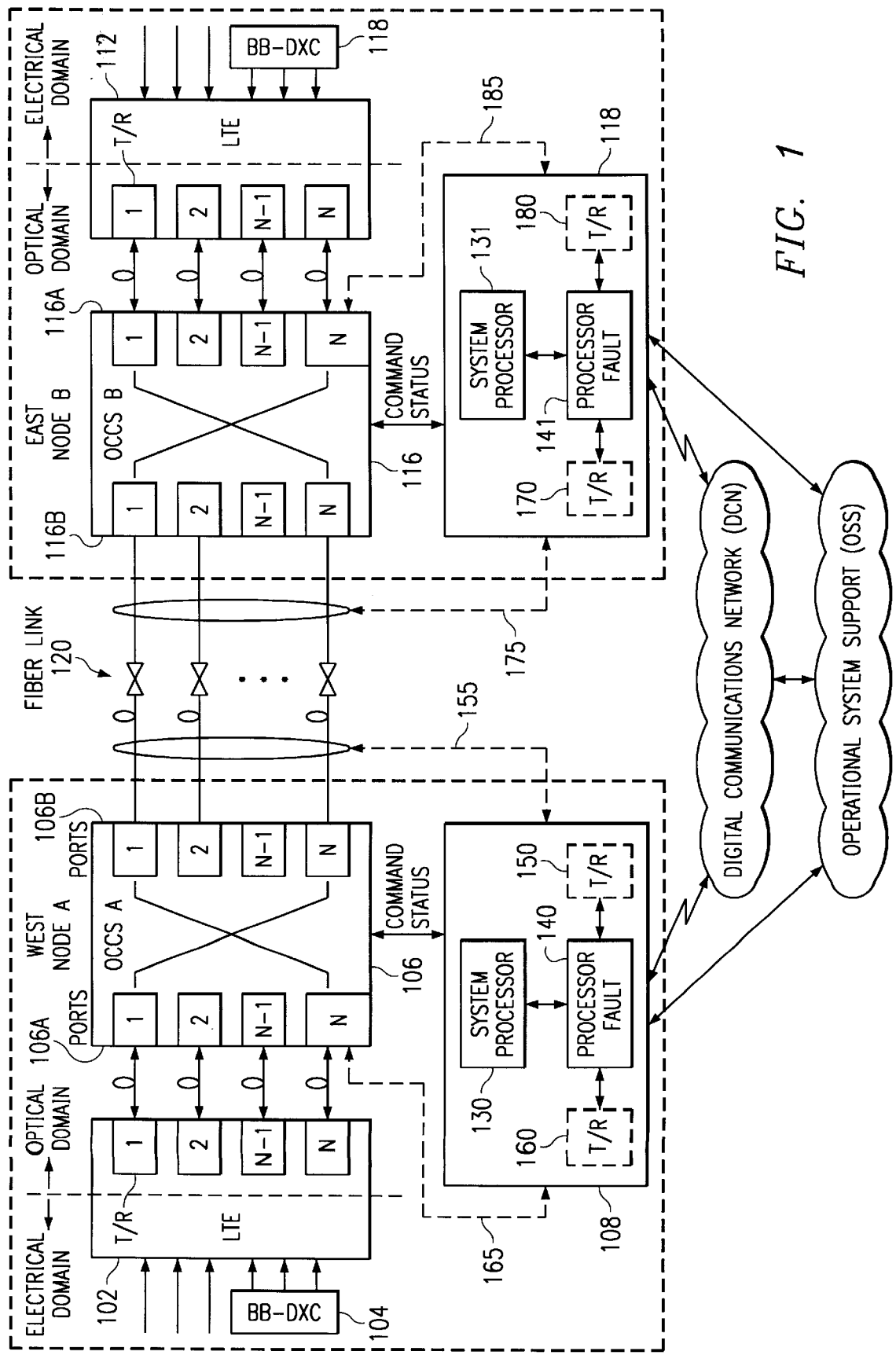
FIG. 1 is a block diagram illustrating fiber fault detection within the optical domain of a network according to the present invention.

The present invention will now be described with reference to the accompanying drawings. In the drawings, like reference numbers indicate identical or functionally similar elements. Additionally, the left-most digit(s) of a reference number typically identifies the drawing in which the reference number first appears.

DETAILED DESCRIPTION OF THE PREFERRED EMBODIMENTS

Table of Contents

I. Overview
II. Example Environment
III. Fiber Communications Link
   a. Electrical-Optical Domain Interface
   b. Network Optical Domain
IV. Fault Detection in the Network Optical Domain
   a. Broadcasting Fault Detection Signals
   b. Switching Fault Detection Signals
      i. OTDR Detection Module
      ii. Fiber Connectivity Module
V. Integrated OCCS and T/R Unit
VI. Distinctive Optical Fault Detection Signals
VII. Conclusion I. Overview The present invention detects fiber optic signal degradation or loss in the optical domain of a fiber network. Optical cross-connect switches (OCCS) are provided at network nodes. Optical data traffic is conducted between nodes via a fiber link. The fiber link extends between respective ports of the optical cross-connect switches at each network node. Dedicated optical signals for detecting faults are introduced and removed within the optical domain of the fiber network. In one embodiment, transmitter/receiver units are coupled directly to the fiber link for broadcasting optical fault detection signals. In another embodiment, transmitter/receiver units are coupled to the fiber link through one or more dedicated ports within optical cross-connect switches (OCCS) at network nodes. Optical signals for fault detection are broadcast or switched through working and/or spare fibers. Distinctive optical fault detection signals are used when the signals are broadcast or switched over working fibers.

II. Example Environment

The present invention is described in the example environment of a fiber optic communications network. In particular, fault detection over a long-distance fiber optic trunk linking two nodes is considered. Description in these terms is provided for convenience only. It is not intended that the invention be limited to application in this example environment. In fact, after reading the following description, it will become apparent to a person skilled in the relevant art how to implement the invention in alternative environments.

III. Fiber Communications Link

FIG. 1 is a block diagram of a fiber fault detection system in two nodes of a fiber link according to the present invention. In particular, nodes A and B are connected by an east-west fiber link 120. These nodes can be part of an overall local, national or global telecommunications network. The invention is not limited to a particular type of network topology or hierarchy. For example, as would be apparent to one skilled in the art, the nodes A and B and the fiber link 120 can be configured in ring, full mesh, or partial mesh topologies, or combinations thereof. Fiber link 120 can also be an intermediate span within a longer path between endpoint nodes. Tandem-nodes and multiple-level hierarchies can be used in a network design.

Node A consists of a lightwave or line terminal element unit (LTE)102, a broadband digital cross-connect switch unit (BB-DXC) 104, optical cross-connect switch (OCCS) 106, and a OCCS controller 108. Node B similarly consists of a light terminal element unit (LTE)112, a broadband digital cross-connect switch unit (BB-DXC) 114, optical cross-connect switch (OCCS) 116, and a OCCS controller 118. Because Node B consists of substantially the same elements as Node A, the operation of Node B will not be described in detail.

a. Electrical-Optical Domain Interface

At node A, data signals are converted from the electrical domain to the optical domain (and vice versa) at the LTE 102. Light source arrays can be utilized to produce modulated optical carrier signals. Multiplexers can be added to multiplex multiple input electrical signals to produce a drive signal for driving light sources in LTE 102 at a higher bit rate. Light detector arrays detect multiple optical carrier signals and produce representative electrical signals. Demultiplexers further separate the detected electrical signals output from LTE 102.

BB-DXC 104 is connected to LTE 102 for controlling switching and transmission of data signals. For example, common data carrier standards for digital signal transmission such as DS3, OC-3, OC-12, OC-48, and OC-192 used in SONET networks can be processed by LTE 102 and/or BB-DXC 104. As would be apparent to one skilled in the art, hardware and/or software for implementing LTE 102 and BB-DXC 104 (and LTE 112 and BB-DXC 114) is generally well-known and need not be described further.

Digital optical signals, i.e. Optical Carrier signals (OC-1 to OC-192), are emitted by LTE 102 and optically coupled to input ports of OCCS 106. Alternatively, BB-DXC 104 can be coupled to direct optical signals to OCCS 106. OCCS controller 108 then switches the optical paths through OCCS 106 to distribute optical signals across the fiber link 120 depending upon fiber availability, capacity, traffic demands, and other network considerations. For instance, system processor 130 can be used to monitor the status of OCCS 106, i.e. the switch state, and to issue switch commands. Similarly, digital optical signals sent from node B to Node A are output from OCCS 106 ports to detectors in LTE 102 and/or BB-DXC 104.

b. Network Optical Domain

Considering the optical domain in more detail, one face 106A of OCCS 106 has N ports optically coupled (e.g. through fibers) to receive respective optical signals from LTE 102. The opposite OCCS face 106B has N ports optically coupled to the respective fibers of fiber link 120. OCCS 106 switches any or all of the optical signals passing between its ports. For example, optical signals received from LTE 102 at any of ports 1 to N at face 106A can be switched to exit any of ports 1 to N at face 106B. Specific software and/or hardware implementations for addressing, monitoring, and controlling OCCS 106 through system processor 130 based on the number of ports and switch configurations would be apparent to one skilled in the art.

In FIG. 1, OCCS controller 108 includes system processor 130, fault processor 140, transmitter/receiver (T/R) unit 150 (and/or T/R unit 160). The operation of the T/R units and fault processor in detecting optical fault within the network optical domain will be described in detail below with respect to FIGS. 2 to 6.

The OCCS controller 108 is further coupled to a separate, off-band Digital Communications Network (DCN) and/or to an Operational Support System (OSS). The DCN is an ultra-reliable data network which is provided for communicating status signaling messages between nodes regarding system operation, faults, etc. In general, the DCN can transport status messages in any type of network protocol including Frame Relay, ATM, X.25, TCP/IP, and/or B-ISDN protocols. The Operational Support System is a centralized network manager which oversees global network operations including network restoration.

OCCS controllers 108, 118 include a module at each node for storing and processing status signaling messages. Such status signaling message processing can be incorporated in the system processors 130, 131 and/or fault processors 140, 141. In this way, different nodes can communicate status information through the DCN to coordinate fault detection efforts and increase accuracy. For example, each OCCS controller 108, 118 can send active or fault status signals (i.e. by setting an active or fault bit or field) through the DCN indicating a normal working state or a fault. After sending a fault status an OCCS controller waits for confirmation from the other node that a fault has been detected.

The OSS can be notified after both nodes have confirmed a fault. Either the system processor 130,131 or the fault processor 140,141 can send the confirmed fault indication to the OSS. This improves the accuracy of the fault detection and reduces the number of false fault indications. The OSS can then initiate restoration algorithms and procedures to avoid a faulty link (due to a fiber failure, cable cut, nodal failure or other system error) with greater confidence.

The present fault detection system is not dependent on the number of ports or the type of optical cross-connect switch used. In principal for an N×N OCCS any number of ports (e.g., N=4, 16, 40, 72, 128, or 256) can be switched. Any type of optical switch can be used depending upon the available technology. See, e.g., the integrated directional-coupler type switches discussed by Waynant, R. et al., Eds., *Electro-Optics Handbook*, McGraw-Hill, Inc. U.S.A. (1994), chapter 26, and especially page 26.34 (incorporated herein by reference). For example, OCCS 106 can consist of a 16×16 $LiNbO_3$ switch (N=16). Sixteen ports are then available on each OCCS face 106A,106B for switching optical signals. Other suitable optical switching technologies include switches based on a thermo-optic effect in polymer waveguides or silica glass, semiconductor amplification, piezo movement, and integrated indium phosphide.

In addition, while a single, N×N multi-port OCCS is shown schematically herein for clarity, multiple discrete switches and couplers can be used to perform equivalent optical switching. For example, a set of discrete 1×2 or 2×2 optical switches can be used to switch individual tributary signals between working and/or protect fibers in fiber link 120. Multiple Y-couplers and directional couplers can also be used. In general, the number of fibers, port counts, and/or discrete switches can increase to accommodate a variety of architectures.

Fiber link 120 consists of working and/or spare fibers. The number of fibers typically, but not necessarily, matches the number of ports N. One or more spare fibers are optionally provided to allow traffic to be re-routed in the event a working fiber becomes inoperative or over-taxed. Optical fault detection signals can be sent over working and/or spare fibers in fiber link 120. According to one aspect of the present invention, distinctive optical fault detection signals, distinguishable from normal data traffic, are transported over working fibers. In another aspect of the invention, the spare fibers can be used to carry fault detection optical signals without interfering with normal data traffic.

IV. Fault Detection in the Network Optical Domain

According to the present invention, fault detection is provided within the optical domain of a network. Dedicated optical fault detection signals are introduced and removed entirely within the optical domain. According to one embodiment, transmitter/receiver (T/R) units 150, 170 are coupled to the fiber link 120 through respective optical links 155, 175. For instance, optical link 155 can consist of a uni-directional or bi-directional fiber arrangement for optically coupling a dedicated T/R unit 150 directly with fiber link 120. Optical signals for fault detection can be broadcast from T/R unit 150 over one or more working and/or spare fibers of fiber link 120 to T/R unit 170 at node B.

According to another embodiment, T/R units 160, 180 are coupled to one or more dedicated ports of the OCCSs 106, 116 through respective optical links 165, 185. For instance, optical link 165 can consist of a uni-directional or bi-directional fiber arrangement for optically coupling dedicated transmitter/receiver 160 with fiber link 120 through a dedicated port N at face 106A. Optical signals for fault detection issued by T/R unit 160 can be switched through OCCS 106 over one or more working and/or spare fibers of fiber link 120.

Fault processor 140 is coupled to the T/R unit 150 or 160 for detecting faults based on received optical fault detection signals. Status signals indicative of any detected faults are then output by fault processor 140 (or system processor 130) through the separate digital communication network (DCN) linking at least the network nodes A and B. As described earlier, when each node is detecting optical faults, fault processor 141 at node B will also send a fault indication through the DCN which confirms the fault detected by node A.

OCCS controller 108 at node can then send a confirmed, accurate fault indication signal to the OSS. Depending upon where status signaling messages are stored and tracked, system processor 130 or fault processor 140 can issue the confirmed fault indication signals to the OSS and receive restoration commands from the OSS for re-routing traffic through the OSSC 106. Known network restoration schemes, i.e. distributed restoration, can be invoked to avoid loss of service until repairs are made. Other system designs for responding to a fault indication by fault processor 140 would be apparent to one skilled in the art.

Bi-directional fibers are shown in FIG. 1. Two uni-directional fibers carrying optical signals in opposite directions between the nodes A and B could be substituted for each bi-directional fiber. Generally, any type of fiber including single-mode, multi-mode, dispersion-shifted, non-dispersion shifted, or modified-dispersion shifted fiber can be used.

a. Broadcasting Fault Detection Signals

Figure 2:
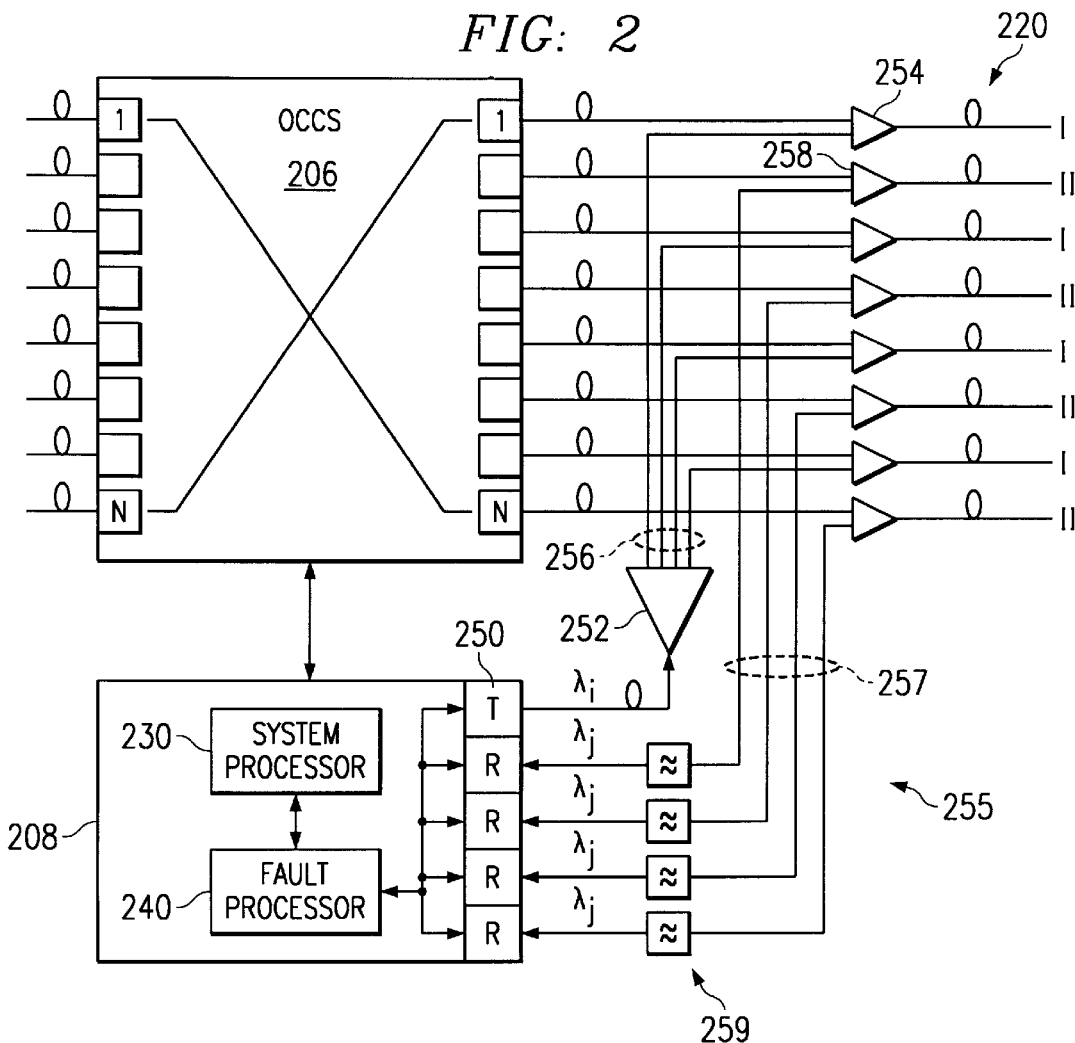
FIG. 2 is a block diagram of one node in a first configuration broadcasting optical signals for fault detection over a fiber link.

FIG. 2 is a block diagram example of node A according to a first embodiment of the present invention. Optical link 255 couples OCCS controller 208 and in particular, a T/R unit 250, with a fiber link 220. T/R unit 250 consists of a transmitter T and a receiving array R. Fiber link 220 consists of working and/or spare fibers.

Transmitter T at node A broadcasts an optical signal for fault detection which can be distinguished by receiving array R from other optical signals carrying normal network data traffic. For example, transmitter T can consist of a laser source or array, such as a laser diode, generating a distinctive optical signal at wavelength $\lambda_i$ for transmission over working and/or spare fibers. Alternatively, optical signals for fault detection can be sent over spare fibers only in fiber link 220, thereby avoiding potential interference with optical data traffic and a need to use a distinctive wavelength.

The fault detection optical signal then passes through an optical coupler 252, e.g. a waveguide branch coupler, which splits the signal into N/2 signals guided by fibers 256. These optical signals enter respective uni-directional fibers I transporting data from Node A to Node B. Well-known optical couplers/splitters 254, such as passive directional or tap couplers, can be used to optically couple fibers 256 with fiber link 220.

Receiving array R consist of individual detectors, i.e. PIN diodes. The detectors are optically coupled through respective fibers 257 to fiber link 220. Couplers or splitters 258 split optical signals off through fibers 257. For example, simple tap couplers or 5/95 splitters can be used to direct a portion of the optical signals traveling toward node A from uni-directional fibers II to receiver array R.

Detectors in receiving array R respond to optical fault detection signals input through fiber link 257. In a simple example, each detector outputs a hi/lo electrical signal, i.e. 0 or 5 volts, representing the presence or absence of the optical signals. The absence of an optical signal indicates a potential fiber fault condition. Fiber faults for a particular link or span are thus detected quickly in the optical domain of the network, i.e. less than two seconds for each fiber.

A bank of optical filters 259 is provided, when necessary, in each fiber optic path 257 to filter optical fault detection signals. In current Wavelength Division Multiplexing (WDM) data communication networks, data is carried at or near either of two wavelengths, 1310 or 1550 nm. For example, optical data signals can be carried in four-wavelengths $\lambda_a$ to $\lambda_d$ at or near 1550 nm. A wavelength $\lambda_i$=1533 nm. is used for optical fault detection signals. The wavelength filters 259 can then be tuned to 1533 nm. to match the wavelength Alternatively, when the node B transmitter T, transmits at another wavelength $\lambda_j$, wavelength filters 259 then match the node B wavelength $\lambda_j$. By detecting signals from node B at a different wavelength, i.e. $\lambda_j$=1532 nm., receiver R at node A encounters less interference from the node A transmitter. As stated earlier, optical fault detection signals can be sent over working and/or protect fibers. Tunable filters 259 filter the fault detection signals from other data traffic. When optical fault detection signals are only sent over spare fibers in fiber link 220, tunable filters 259 to discriminate data traffic are not necessary.

Fault processor 240 processes the output of receiver R and reports individual fiber active/failure status quickly through the digital communications network (DCN). Because fiber fault is detected in the network optical domain, fault processor 240 can respond to fiber failure in the subsecond range—a much faster response than the 2 to 5 second limit for LTE-based detection in the electrical domain. For instance, the absence of a optical fault detection signal can be detected by the fault processor in milliseconds i.e. 10–50 msec. OCCS 206 can then be switched in microseconds to re-store communication.

Figure 3:
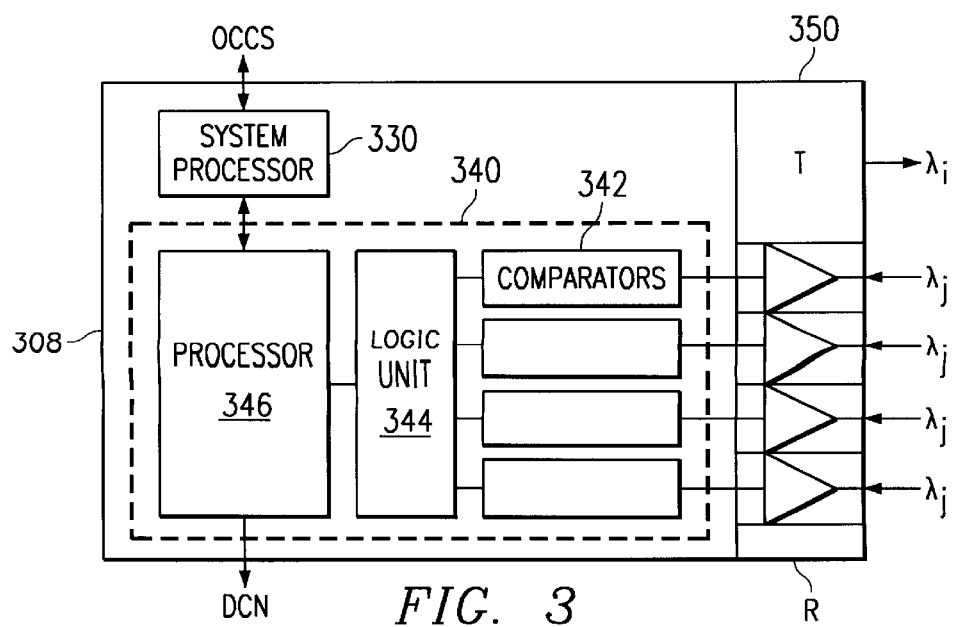
FIG. 3 is a block diagram showing an example of a transmitter/receiver unit and processor for detecting faults according to the first configuration.

FIG. 3 shows a more detailed example of a OCCS controller 308 used to detect fiber fault in the network optical domain. OCCS controller 308 includes system processor 330, fault processor 340, and T/R unit 350. Relatively simple comparison and logic processing in fault processor 340 detects the presence/absence of the optical signals, and therefore, physical fiber fault or other system error. In T/R unit 350, detector signals from array R are compared to predetermined thresholds in comparators 342. Logic unit 344 evaluates which fibers, if any, have faults. Processor 346 then receives the output from logic unit 344 and sends a corresponding fault status message through the DCN.

Time delay circuitry or processing (not shown) can be included in the logic unit 344 to avoid construing false, momentary lapses as permanent physical failures. This way checks are made to ensure an outage has persisted for a predetermined period of time, i.e. at least two clock cycles. Optical signals impairments (as opposed to a complete optical loss) can also be determined from erratic signal behavior, such as, irregular timing or intensity fluctuations/diminishment.

In general, the above fault processing can be implemented through hardware, firmware, software and/or combinations thereof as would be apparent to one skilled in the art. Such comparison and time delay processing is well-known and various, alternative designs for implementing the functions described above would be apparent to one skilled in the art.

b. Switching Fault Detection Signals

Figure 4:
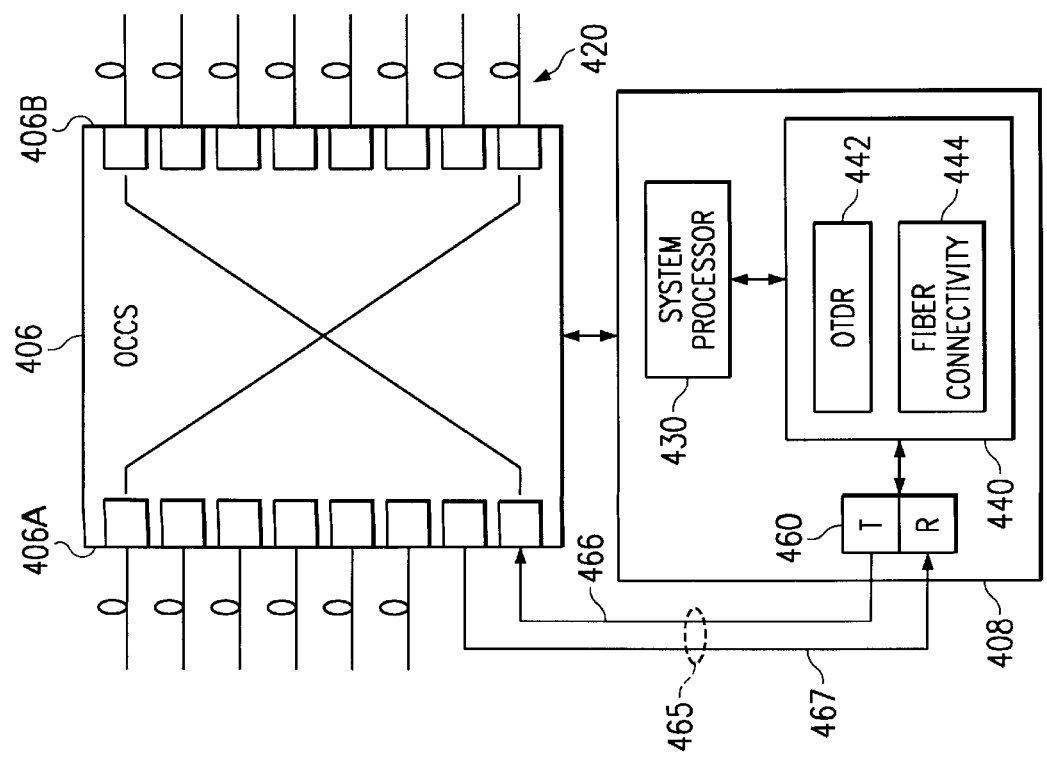
FIG. 4 is a block diagram of one node in a second configuration switching optical signals through one or more dedicated OCCS ports for fault detection over a fiber link.

FIG. 4 is a block diagram example of node A according to a second embodiment of the present invention. Through T/R unit 460 the OCCS controller 408 is coupled in the network optical domain to fiber link 420. Optical link 465 optically couples light between the T/R unit 460 and one or more dedicated ports of OCCS face 406A.

T/R unit 460 consists of a transmitter T and a receiver R. Transmitter T sends optical signals for fault detection from node A across fiber link 420 to node B. Receiver R receives optical fault detection signals issued by node B and sent over fiber link 420. OCCS controller 408 further includes system processor 430 and fault processor 440. Fault processor 440 includes an OTDR (Optical Time Domain Reflectometry) module 442 and/or a fiber connectivity module 444.

The one or more dedicated ports on OCCS face 406A are reserved to couple optical signals between T/R unit 460 and fiber link 420. Separate dedicated ports couple light through respective unidirectional fibers 466, 467. Only one dedicated port is required when a single fiber, i.e. a bi-directional fiber, couples both transmitted and received light. In any event other ports in face 406A remain available for switching data traffic. All of the N ports at face 406B can be used for switching data traffic and/or the optical fault detection signals. Alternatively, some ports at face 406B can be coupled to unoccupied spare fibers to pass the optical fault detection signals.

Two basic modes of fault detection within the network optical domain are achieved in the example of FIG. 4: (1) Optical Time Domain Reflectometry (OTDR) and (2) Fiber Connectivity (Working and/or Spare Fibers). Each detection mode can be implemented, separately or in combination, in the respective modules 442, 444 (software and/or hardware) in fault processor 440.

i. OTDR Detection Module

Figure 5:
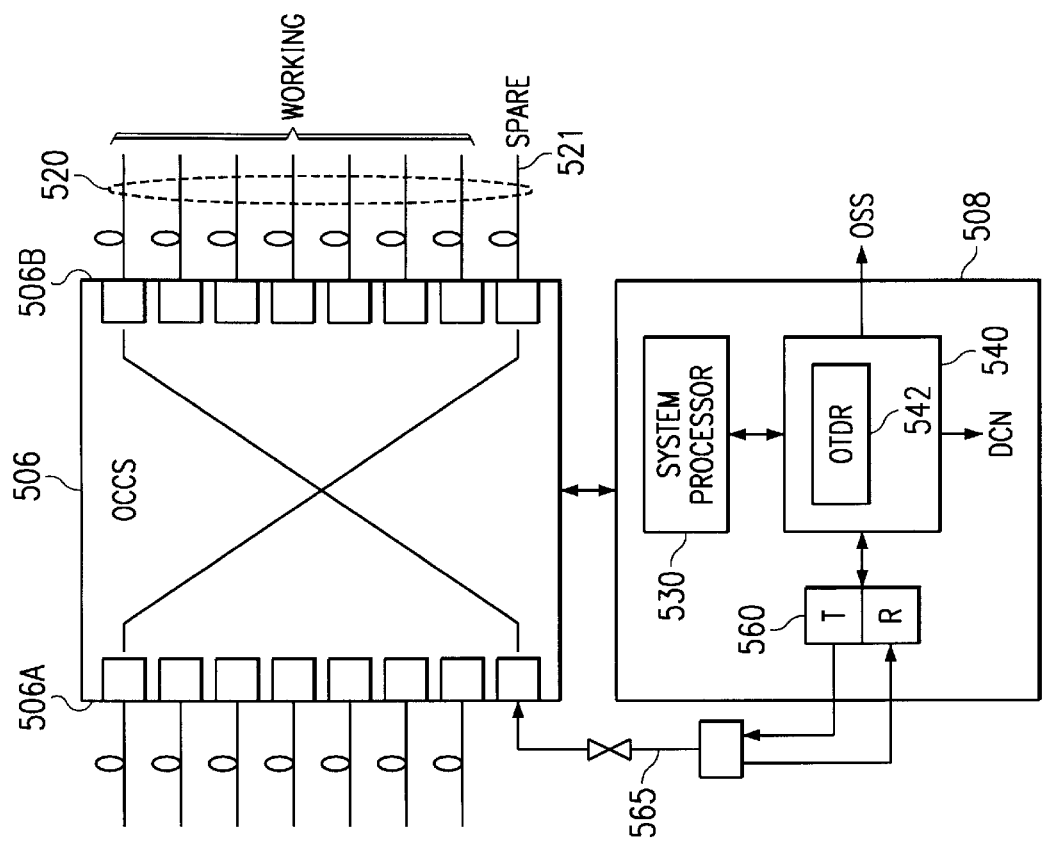
FIG. 5 is a block diagram showing a transmitter/receiver unit and fault processor in the second configuration using OTDR.

FIG. 5 shows a fault processor 540 incorporating an OTDR module 542 in more detail. Sensitive OTDR measurements of fiber quality can be performed on any of the fibers of fiber link 520. Transmitter T transmits an OTDR pulse which is coupled through bi-directional fiber 565 to the dedicated port N at face 506A. The OTDR pulse is then switched through waveguides within the OCCS 506 to the fiber being measured in accordance with control signals sent from System processor 530.

As is well-understood in OTDR measurement, back-reflected pulses result from fiber irregularities due to fiber degradation or failure. These back-reflected OTDR pulses return to OCCS 506 and are switched back through the dedicated receiver port N to receiver R. Receiver R then detects back-reflected OTDR pulses through fiber 565. OCCS controller 508 includes a conventional OTDR processor 542. Accordingly, among other things, fiber attenuation, degradation, and location of faults can be detected based on the timing, intensity, and other characteristics of the back-reflected OTDR pulses. See, e.g., the article by DeMeis, R., "Select the Right Test Equipment for your Fiber Optic Needs," *Laser Focus World*, pp. 161–73, October 1995 (incorporated by reference herein).

In the present invention, OTDR pulses for fault detection can be sent across working fibers and/or spare fibers in fiber link 520. Preferably, these OTDR pulses are sent over an inactive spare fiber 521 to allow large amplitude OTDR pulses to be sent without interfering with normal link operation. Tunable filters (not shown) can also provided to further discriminate the optical OTDR signals used for fault detection from normal data traffic. Because returning OTDR pulses can be particularly weak, filters can be omitted by conducting OTDR measurements on spare fibers or during off-line periods.

ii. Fiber Connectivity Module

Figure 6:
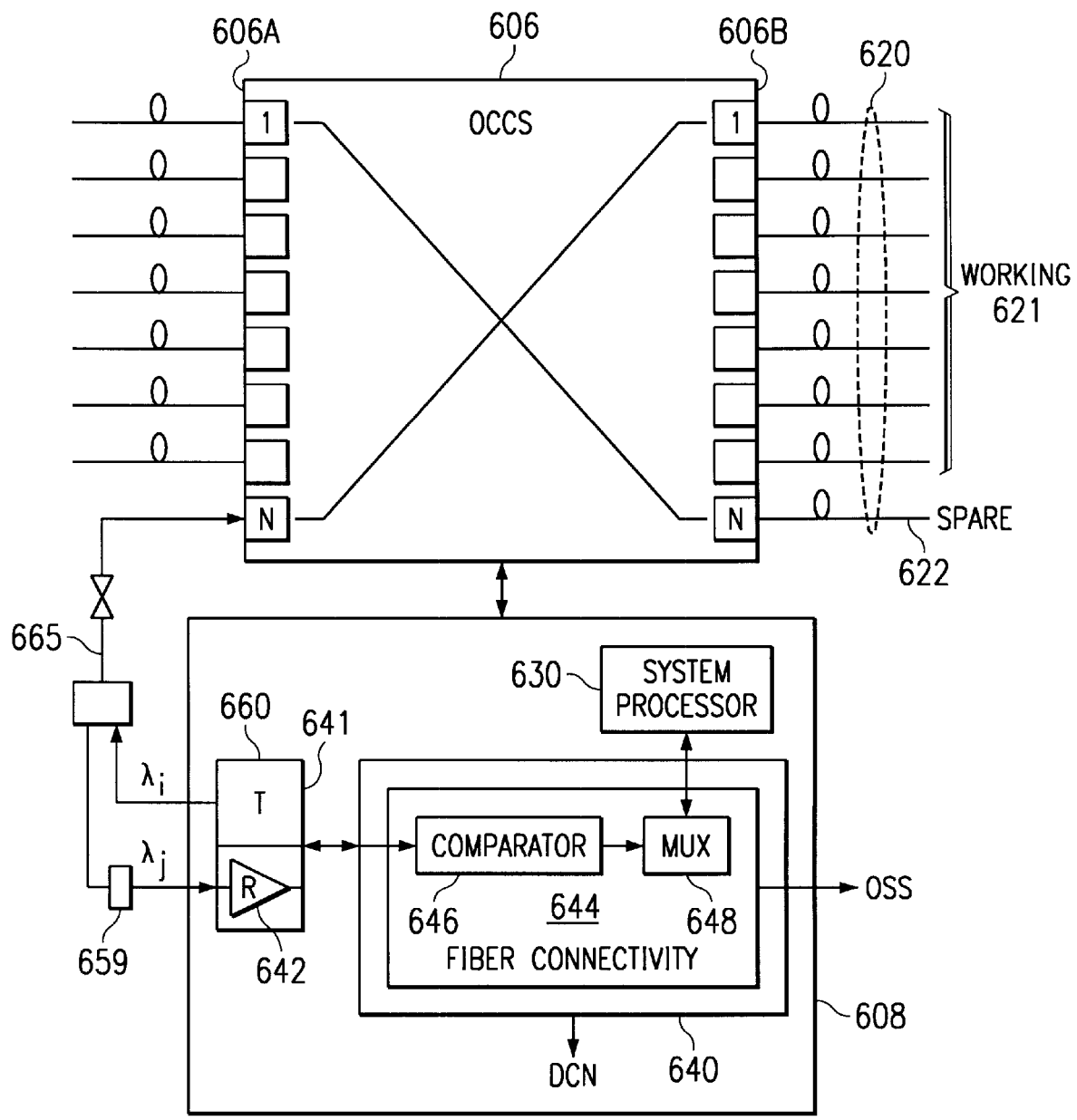
FIG. 6 is a block diagram showing another transmitter/receiver unit and fault processor in the second configuration detecting switched optical signals.

FIG. 6 shows a fault processor 640 incorporating a Fiber Connectivity Module 644 in more detail. Optical link 665 couples T/R unit 660 and at least one dedicated port N at OCCS face 606A. T/R unit 660 consists of a transmitter T 641 and a receiver R 642 for transmitting and detecting optical fault detection signals between nodes A and B over fiber link 620. For example, transmitter T 641 can be a laser source (i.e. a semiconductor laser diode) and receiver R can be a compatible detector (i.e. a PIN diode) or array of detectors.

Preferably, each node A and B has a similar T/R unit. In this way, transmitter T 641 sends optical fault detection signals to a receiver in a T/R unit (not shown) at node B. Receiver R 642 then detects optical fault detection signals sent from the T/R unit at node B. For purposes of determining fiber connectivity between nodes A and B with limited confirmation, node A need only have a transmitter T while node B has a corresponding receiver R.

Fiber Connectivity module 644 includes a comparator 646 and multiplexer processor 648. Signals output from the receiver R 642 are compared to a predetermined reference threshold in comparator 646 to determine the presence and/or absence of an optical fault detection signal. Multiplexer processor 648 tracks the state of OCCS 606 to determine which port at face 606B is currently switched and optically coupled to the dedicated port at face 606A. In this way, multiplexer processor 648 correlates a detected signal with the fiber from which it was or should have been received. Detected optical signals output through comparator 644 which are indicative of impairment or loss can then be matched to the particular source fiber in link 620 having the fault.

As would be apparent to one skilled in switching, any well-known multiplexer scheme (e.g. a clocked binary counter) can be used in system processor 630 to scan and match the status of the OCCS 606 with the comparator 646 output. Fiber connectivity module 644 can then output corresponding fault status indications through DCN to node B. Fault indication signals can also be sent to the OSS, system processor 630, and/or a display alarm/warning unit.

Unlike the configuration of FIG. 2, however, receiver R in T/R unit 660 receives optical signals for fault detection through the optical cross-connect switch OCCS 606. Receiver R can include a tunable filter 659, e.g. a Mach-Zehnder wavelength filter, for filtering distinctive optical signals for fault detection. The filter 659 could be set to the same wavelength as the node A transmitter T. To discriminate between fault signals issued from different nodes and/or to distinguish fault signals from data traffic between nodes, filters 659 can be inserted to transmit at a different wavelength $\lambda_j$. As shown in FIG. 6, receiver R then detects signals at wavelength $\lambda_j$ passing through the filter 659.

In general, optical fault detection signals can be transmitted as described above, over working and/or spare fibers of fiber links 620 to determine fiber connectivity. Switching fault detection signals through the spare fibers only allows normal data traffic to be conducted through other ports in OCCS 606 without interference and avoids the need to use an optical fault detection signal distinguishable from other optical data traffic. Faults (i.e. optical signal impairment or loss) in the spare fiber(s) 622 are then associated with a complete physical cable failure including the active working fibers 621.

V. Integrated OCCS and T/R Unit

Figure 7A:
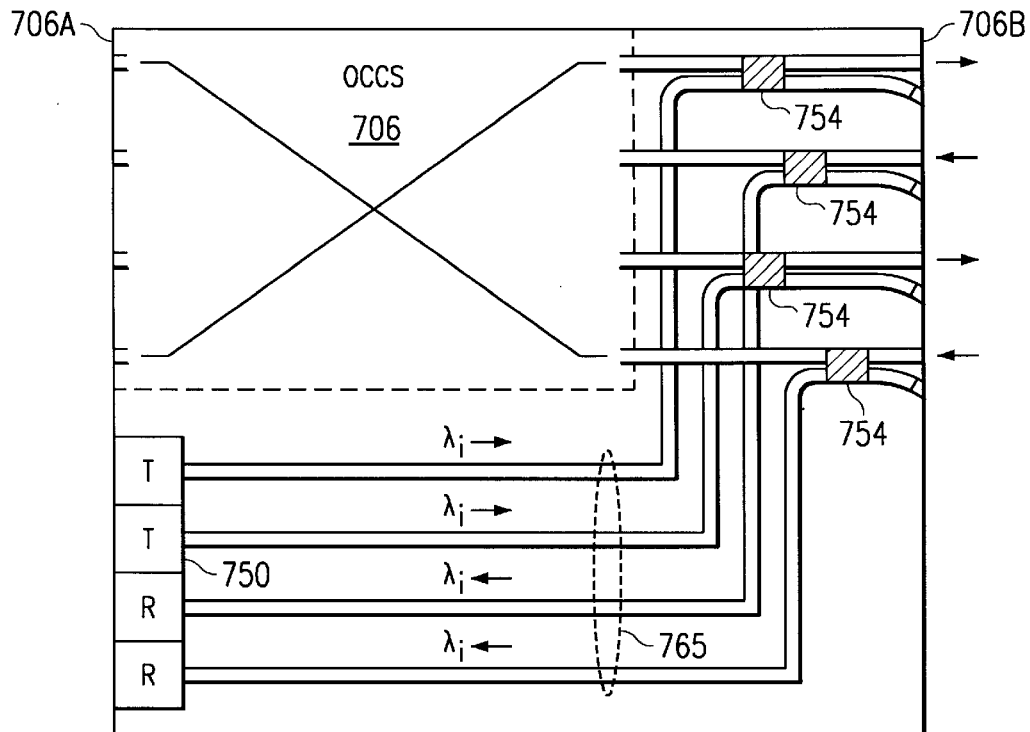
FIGS. 7A and 7B are block diagrams showing integrated optical devices for broadcasting optical signals for fault detection.
Figure 7B:
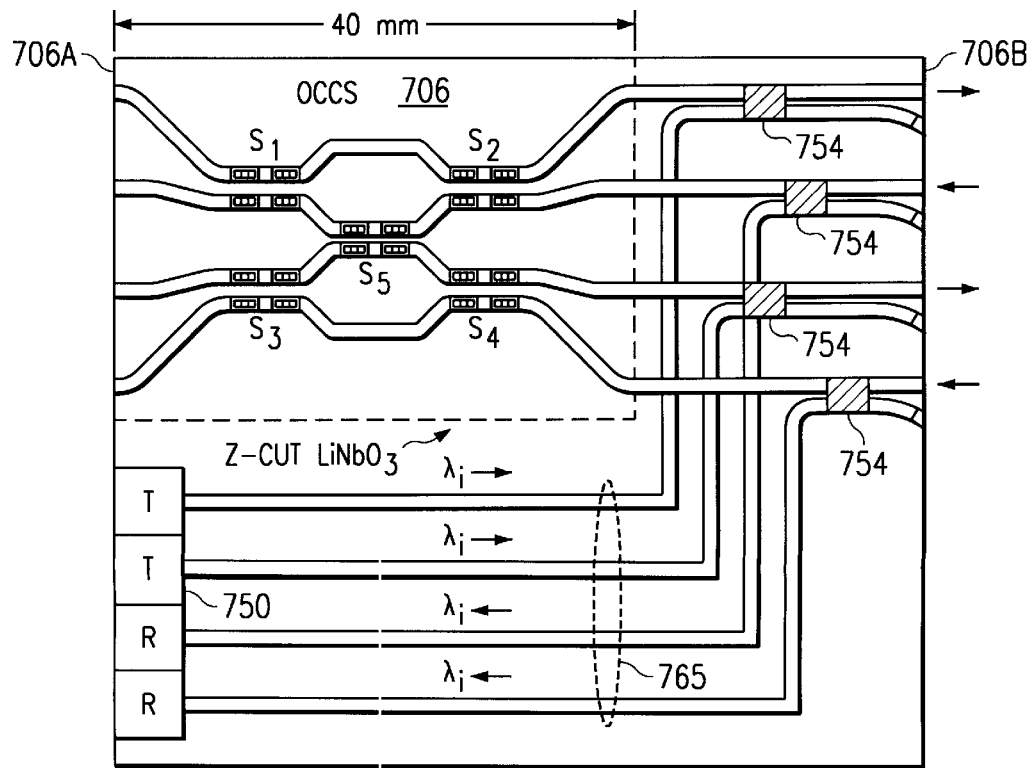

FIGS. 7A and 7B show block diagrams of an OCCS 706 optically coupled through waveguides 765 to T/R unit 750. In FIG. 7A, OCCS 706, waveguides 765, and T/R unit 750 are all integrated on a common substrate 700.

FIG. 7B shows a particular example using a LiNbO$_3$ substrate. A 4×4 Z-cut LiNbO$_3$ switch is shown for simplicity. Alternatively, OCCS can consist of an integrated LiNbO$_3$ 128×128 matrix switch made by NEC.

Integrated channel waveguides 765, i.e. Ti-diffused 3-D channel waveguides, couple light to/from the T/R unit 750 to integrated couplers 754. Couplers 754 can be passive directional couplers which couple light between the waveguides 765 and ports at face 706B. Transmitter array T can consist of a edge-emitting-type laser diode array mounted on face 706A. Receiver array R can consist of side-mounted or embedded photodiode array. See, e.g. Waynant et al., "Optical Integrated Circuits," *Electro-Optics Handbook*, (McGraw-Hill, Inc.:U.S.A.), chapter 26, pp. 26.1–26.39 (1994). Alternatively, T/R unit 750 can be mounted in a separate package or substrate. Light would then be externally coupled to the integrated waveguides 765.

As described with respect to other examples in FIGS. 2 to 6, processors, comparators, logic processing, and/or OTDR detection can be incorporated in a fault processor (not shown) coupled to the T/R unit 750. Integrated tunable filters 759 can also be inserted when a distinctive wavelength for fault detection is sought to be detected.

Finally, given the above description of an example integrated optical electronic device implementing the present invention, other arrangements of integrated components and semiconductor material combinations would be apparent to one skilled in the art.

VI. Distinctive Optical Fault Detection Signals

In the above description, optical fault detection signals are distinguished from normal data communications traffic (i.e. SONET OC-192 signal at or about 1330 or 1510 nm.) in a variety of ways. In particular, the optical signals for fault detection can be made unique through physical separation, wavelength, frequency, and/or modulation. First, the optical fault detection signals can be sent over spare fibers which physically separates the fault detection signals from other data traffic. Second, the optical fault detection signals can have a wavelength distinct from the wavelengths dedicated to communication. Finally, the optical fault detection signals can have a recognizable frequency or modulation (such as a pilot tone identifier or a digital subcarrier modulation bit field). In this case, fault processors 140–640 would need to include additional conventional processing for detecting and recognizing such frequency and/or modulation.

VII. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for performing testing and fault isolation of a fiber fault within an optical domain of a fiber communications network, wherein the fiber communications network includes a fiber link having at least one optical fiber for carrying optical network communication signals between a first node having a first optical cross connect switch and a second node having a second optical cross connect switch comprising the steps of:

introducing an optical fault detection signal along the same fiber link as the optical network communication signals, said optical fault detection signal having at least one characteristic distinguishable from the optical network communication signals, at a first location between the first optical cross connect switch and the fiber link, wherein said optical fault detection signal has a wavelength different from a wavelength of the optical network communication signals, said optical fault detection signal being separate from network communication carried on the fiber link and generated by a transmitter optically coupled to said first location;

removing said optical fault detection signal carried along the fiber link at a second location between the fiber link and the second optical cross-connect switch with a receiver unit optically coupled to said second location, wherein said optical fault detection signal is introduced and removed entirely within the optical domain of the communications network; and processing said optical fault detection signal to detect and isolate the fiber fault in the fiber link.

2. The method of claim 1, wherein the fiber link includes working and spare optical fibers for carrying the network communication, and wherein:

said introducing step further comprises broadcasting said optical fault detection signal from said transmitter across at least one of said working and spare optical fibers, and said removing step further comprises detecting said optical fault detection signal broadcast across said at least one working and spare optical fibers.

3. The method of claim 1, wherein said optical fault detection signal has a wavelength different from the optical network communication signals emitted by a light terminal element, and wherein said removing step further comprises:

splitting a portion of said network communication signals and said optical fault detection signal from said at least one optical fiber in the fiber link; and filtering to transmit only said optical fault detection signal to the receiver.

4. A method for performing testing and fault isolation of a fiber fault within an optical domain of a fiber communications network, wherein the fiber communications network includes a fiber link having at least one optical fiber for carrying optical network communication signals between a first node and a second node, each node having an optical cross connect switch, wherein at each node the optical cross-connect switch has a first and a second set of ports, comprising the steps of:

dedicating at least one port in said first set of ports for fault detection;

introducing an optical fault detection signal separate from network communication, having at least one characteristic distinguishable from the optical network communication signals, wherein said optical fault detection signal has a wavelength different from a wavelength of the optical network communication signals and said optical fault detection signal capable of being transmitted along the same fiber link as the optical network communication signals, said optical fault detection signal, said introducing step comprises optically coupling a transmitter to at least one dedicated port in said first set of ports in the optical cross-connect switch at the first node within the optical domain of the network;

removing said optical fault detection signal, said removing step comprises optically coupling a receiver to at least one dedicated port in said first set of ports in the optical cross-connect switch at the first node within the optical domain of the network, wherein said optical fault detection signal is introduced and removed entirely within the optical domain of the communications network; and processing said optical fault detection signal to detect and isolate the fiber fault in the fiber link.

5. The method of claim 4, wherein:

said introducing step further comprises transmitting an OTDR pulse as the optical fault detection signal from said transmitter; and said processing step comprises processing an optical fault detection signal representative of a back-reflection of said OTDR pulse traveling through at least one of working and spare optical fibers in said fiber link.

6. The method of claim 4, wherein:

said introducing step comprises optically coupling a transmitter to at least one dedicated port in said first set of ports in the optical cross-connect switch at the first node within the optical domain of the network; and said removing step comprises optically coupling a receiver to at least one dedicated port in said first set of ports in the optical cross-connect switch at the second node within the optical domain of the network.

7. The method of claim 6, further comprising the step of controlling the optical cross-connect switches at the first and second nodes to switch optical fault detection signals so that they pass through said at least one dedicated port in said first set of ports and through said second sets of ports to at least one of working and spare optical fibers in the fiber link.

8. An apparatus for performing testing and fault isolation of a fiber fault within an optical domain of a fiber communications network, wherein the fiber communications network includes a fiber link having at least one optical fiber for carrying optical data communications traffic between first and second nodes, each node having an optical cross-connect switch, comprising:

means for introducing an optical fault detection signal to a first location between a first optical cross connect switch and the fiber link, said introducing means including means for emitting said optical fault detection signal along the same fiber link as the optical data communications traffic, and means for coupling the optical fault detection signal to at least one optical fiber in the fiber link, said optical fault detection signal having at least one characteristic distinguishable from the optical data communications traffic, wherein said optical fault detection signal has a wavelength different from a wavelength of the optical data communications traffic;

means for removing said optical fault detection signal at a second location between the fiber link and the second optical cross-connect switch after said optical fault detection signal has traveled in at least one fiber in the fiber link, wherein said optical fault detection signal is introduced and removed entirely within the optical domain of the communications network; and means for processing said optical fault detection signal to isolate the fiber fault in the fiber link.

9. An apparatus for performing testing and fault isolation of a fiber fault within an optical domain of a fiber communications network, wherein the fiber communications network includes a fiber link for carrying optical network communication signals between first and second nodes, the first node having a first optical cross-connect switch, and the second node a second optical cross-connect switch, comprising:

a transmitter optically coupled to a first location between the first optical cross-connect switch and the fiber link that emits an optical fault detection signal separate from the network communication, and which travels along the same fiber link as the optical network communication signals, said optical fault detection signal having at least one characteristic distinguishable from the optical network communication signals, wherein said optical fault detection signal has a wavelength different from a wavelength of the optical network communication signals;

a receiver optically coupled to a second point between the fiber link and the second optical cross-connect switch to detect said emitted optical fault detection signal and to provide an output signal representative thereof, wherein said optical fault detection signal is introduced and removed entirely within the optical domain of the communications network; and a fault processor connected to said receiver to evaluate said receiver output to isolate the fiber fault.

10. The apparatus of claim 9, wherein the fiber link includes at least one of working and spare optical fibers.

11. The apparatus of claim 9, wherein said optical fault detection signal emitted by said transmitter has the wavelength as the same optical network communication signals, wherein said optical fault detection signal is modulated at a frequency different from a modulation rate of the optical network communication signals.

12. The apparatus of claim 9, wherein said transmitter comprises at least one light emitter and said receiver comprises at least one light detector and a wavelength selective filter.

13. The apparatus of claim 9, wherein said transmitter is provided at the first node and said receiver is provided at the second node.

14. The apparatus of claim 9, wherein said transmitter is provided at the first node and said receiver is provided at the first node and further comprising an OTDR transceiver optical coupled within the network optical domain to the fiber link.

15. The apparatus of claim 9, further comprising:
a first optical link between said transmitter and a first point along the fiber link; and
a second optical link between said receiver and a second point along the fiber link.

16. The apparatus of claim 9, further comprising:
a first optical link between said transmitter and at least one dedicated port in the first optical cross-connect switch, whereby said optical fault detection signal emitted by said transmitter enters said at least one dedicated port in the first optical cross-connect switch, travels through the first optical cross-connect switch, and, depending upon the switch state of the first optical cross-connect switch, passes from the first optical cross-connect switch to said at least one optical fiber in the fiber link.

17. The apparatus of claim 9, further comprising:
a second optical link between said receiver and at least one dedicated port in the first optical cross-connect switch.

18. The apparatus of claim 16, further comprising:
a second optical link between said receiver and at least one dedicated port in the second optical cross-connect switch, whereby said optical fault detection signal after traveling along said at least one optical fiber enters the second optical cross-connect switch, and, depending upon the switch state of the second optical cross-connect switch, passes from said at least one dedicated port in the second optical cross-connect switch through said second optical link to said receiver.

19. The apparatus of claim 9, wherein the first optical cross-connect switch comprises an integrated optical cross-connect switch.

20. The apparatus of claim 9, further comprising:
a first substrate having first and second faces, said first substrate including the first optical cross-connect switch integrated on said first substrate for switching light passing between ports provided at said first and second faces of said first substrate, a first set of optical waveguides integrated on said first substrate, and a first set of couplers integrated on said first substrate for coupling light between said first optical cross-connect switch and said first set of optical waveguides; and a second substrate having third and fourth faces, said second substrate including the second optical cross-connect switch integrated on said second substrate for switching light passing between ports provided at said third and fourth faces, a second set of optical waveguides integrated on said second substrate, and a second set of couplers integrated on said second substrate for coupling light between said second optical cross-connect switch and said second set of optical waveguides; wherein, said first set of integrated optical waveguides optically couple said transmitter to the fiber link and said second set of integrated optical waveguides optically couple said receiver to the fiber link.

21. The apparatus of claim 9, wherein said fault processor comprises:
a comparator for comparing said receiver output to a predetermined threshold to determine the absence of said optical fault detection signal.

22. The apparatus of claim 14, wherein said fault processor comprises an OTDR module and a Fiber Connectivity module.

23. The apparatus of claim 9, wherein said transmitter transmits an optical fault detection signal having at least one characteristic distinguishable from the network communication.

24. The apparatus of claim 23, wherein said at least one characteristic comprises a unique wavelength, and further comprising at least one wavelength filter tuned to said unique wavelength for filtering said optical fault detection signal passed to said receiver.

25. An apparatus for detecting a fiber fault within an optical domain of a fiber communications network, wherein the fiber communications network includes a fiber link for carrying network communication between first and second nodes, the first node having a first light terminal element and a first optical cross-connect switch, and the second node having a second light terminal element and a second optical cross-connect switch, comprising:

- a first optical cross-connect switch controller located at the first node, said first optical cross-connect switch controller including a first transmitter/receiver unit and a first fault processor; and
- a second optical cross-connect switch controller located at the second node, said second optical cross-connect switch controller including a second transmitter/receiver unit and a second fault processor;

wherein said first optical cross-connect switch controller and said second optical cross-connect switch controller are optically coupled to a line side of the respective optical cross-connect switches within the optical domain of the network to the fiber link to process an optical fault detection signal separate from the network communication traffic, said optical fault detection signal having at least one characteristic distinguishable from the network communications traffic, wherein said optical fault detection signal has a wavelength different from a wavelength of the network communications traffic, and wherein said optical fault detection signal is introduced and removed entirely within the optical domain of the communications network.

* * * * *